United States Patent [19]
Link et al.

[11] Patent Number: 5,455,993
[45] Date of Patent: Oct. 10, 1995

[54] TOOL TURRET FOR A MACHINE TOOL, IN PARTICULAR A LATHE

[75] Inventors: Friedrich Link, Aichwald; Walter Grossman, Baltmannsweiler, both of Germany

[73] Assignee: Index-Werke GmbH & Co. KG Hahn & Tessky, Esslingen, Germany

[21] Appl. No.: 185,991

[22] Filed: Jan. 14, 1994

[30]   Foreign Application Priority Data

Jul. 27, 1991 [DE]   Germany .................. 41 25 003.6

[51] Int. Cl.⁶ ................................................. B23B 29/32
[52] U.S. Cl. ..................... 29/40; 408/35; 82/159
[58] Field of Search .................. 29/40, 33 J; 82/159; 408/35; 409/201, 211; 451/401; 483/32

[56]         References Cited

U.S. PATENT DOCUMENTS

| | | | |
|---|---|---|---|
| 4,467,680 | 8/1984 | Kettel | 82/159 |
| 4,468,991 | 9/1984 | Reusch et al. | 82/159 |
| 4,704,926 | 11/1987 | Boffelli | 82/159 |
| 5,168,614 | 12/1992 | Thumm | 29/40 |

FOREIGN PATENT DOCUMENTS

| | | |
|---|---|---|
| 250481 | 10/1987 | German Dem. Rep. . |
| 3630966 | 3/1987 | Germany . |
| 3929803 | 1/1991 | Germany . |
| 665585 | 5/1988 | Switzerland . |

*Primary Examiner*—Z. R. Bilinsky
*Attorney, Agent, or Firm*—Edward J. Timmer

[57]        ABSTRACT

Tool turret for a machine tool, the turret head of which is designed to be equipped with drivable tools, wherein for shortening the times required for indexing the rotatable turret head a three-part HIRTH tooth system is used to lock the turret head and a coupling which is constructed such that it can be disengaged by rotation of the turret head is provided between a drive shaft of the tool turret and a tool spindle of a drivable tool.

26 Claims, 6 Drawing Sheets

TOOL TURRET FOR A MACHINE TOOL, IN PARTICULAR A LATHE

BACKGROUND OF THE INVENTION

The invention relates to a tool turret for a machine tool, in particular a lathe, comprising a turret head mounted on a turret head carrier for rotation about a turret axis and having a plurality of tool stations, the turret head being lockable against rotation and having at each of a plurality of its tool stations a receiving means for the insertion of a tool holder for a tool adapted to be rotatably driven, the tool holder having a tool spindle, also comprising a drive shaft defining a working position for the tool stations, the turret head being rotatable about the turret axis relative to the drive shaft, as well as a coupling having at least two coupling elements separable from one another for providing a rotary drive connection between the drive shaft and the tool spindle of a tool holder located in the tool station taking up the working position, wherein a first coupling element is arranged on the drive shaft and a second coupling element on the tool spindle.

The tool turrets in general use correspond to the type of construction defined above, and a tool turret of this type is disclosed, for example, in DE-A1-36 30 966 and U.S. Pat No. 4,704,926. This known tool turret is provided with a two-part, so-called HIRTH tooth system (curvic coupling), the one toothed ring of which is securely connected to the turret head carrier and the other toothed ring of which is securely connected to the turret head. In order to index the turret head, i.e. in order to be able to rotate it about the turret axis, the turret head is advanced in the direction of the turret axis and this causes the one toothed ring of the HIRTH tooth system to be lifted off the toothed ring fixed on the turret head carrier. A central shaft serving to drive the tool is rotatably mounted in the turret head carrier coaxially to the turret axis and it bears on its front end facing the turret head a first bevel wheel of a miter gear which is arranged in the interior of the turret head and comprises for each tool station of the turret head a driven shaft which is rotatably mounted in the turret head, is radially oriented in relation to the turret axis and provided with a second bevel wheel. When the turret head is unlocked, all the driven shafts are also displaced so that their bevel wheels are lifted off the bevel wheel of the central shaft. A complete, actuatable coupling is located between each driven shaft and each tool spindle. The turret head carrier has a projection associated with the tool station located in working position. Due to this projection and a piston mounted in the turret head for displacement in axial direction, that coupling which is associated with the tool station located in working position is engaged.

This known tool turret has a number of disadvantages which are typical for all the known tool turrets of the type mentioned at the outset: In order to unlock the turret head, this must be moved in axial direction before it can be rotated, i.e. indexed further, about the turret axis. In view of the relatively large mass of the turret head and all the tools carried by it, this axial movement can be carried out only at a moderate speed since considerable shocks otherwise occur, i.e. it is not possible to index the turret head quickly and relatively long idle times, in which work cannot be done with a tool of this tool turret, are the result. An additional disadvantage of the known tool turret described in the aforesaid is the fact that all the gear elements, which are arranged after the bevel wheel of the central shaft, and their bearings must also carry out the axial movement together with the tool turret. Furthermore, the couplings between the driven shafts of the miter gear and the tool spindles are of a relatively complicated construction and special actuating means are required for actuating these couplings since any indexing of the turret head presupposes an actuation of that coupling located in working position. These are circumstances which not only lead to higher production costs but also preclude any reduction in the indexing times for the turret head. Finally, the tool spindles of the tool stations not located in working position can rotate unintentionally and in an undesired manner, in particular during indexing of the turret head (some tools must be used at the correct angle of rotation).

The same applies for another known tool turret (DE-PS 37 30 561), the turret head of which must also carry out an axial movement in order to be unlocked. A drive shaft extending parallel to the turret axis is mounted in the turret head carrier of this known tool turret eccentrically to the turret axis. A first bevel wheel of a miter gear is attached to the end of the drive shaft facing the turret head. This bevel wheel engages with a second bevel wheel of the miter gear in the working position of the turret head and this second bevel wheel is attached to a driven shaft of the miter gear, which is rotatably mounted in the turret head and extends radially to the turret axis. When the turret head is unlocked, the bevel wheel of the miter-gear driven shaft also disengages from the bevel wheel of the miter-gear drive shaft. So that the miter-gear driven shaft and, with it, the tool drive spindle of the associated tool holder cannot rotate unintentionally, the miter-gear driven shaft has a recess at one point of its circumference, in which a spring-loaded locking bolt, which is guided for displacement in the turret head, engages when the turret head is in its indexing position. The locking bolt is lifted out of the recess in the miter-gear driven shaft by an axially oriented pin provided on the turret head carrier when the turret head is moved back into its working position. In this known tool turret, as well, all the tool stations which are provided to be equipped with a tool holder for a drivable tool are provided with a miter-gear driven shaft whereas only one single miter-gear drive shaft is provided, namely for driving the tool which is located in working position—the miter gear is not, therefore, formed by the same two bevel wheels all the time.

Finally, the same applies for another, known tool turret which results from DE-PS 39 29 803 and, with respect to the above comments on the tool turret according to DE-PS 37 30 561, differs from the latter only in that the tool spindles of the tool holders having drivable tools also form the miter-gear driven shafts and are inserted into or removed from the turret head with the actual tool holders.

The object underlying the invention was to provide a tool turret of the type mentioned at the outset which is improved over the state of the art in at least one of the following points: Shortening the indexing times of the turret head, simple (from the point of view of construction and/or procedure) coupling in and out of driven tools, and preferably in a defined angular position of the tool, creating the preconditions for the use of a miter gear of higher quality for driving the tool spindle or spindles so that, for example, permanently higher tool rotational speeds are possible.

SUMMARY OF THE INVENTION

In accordance with the invention it is now suggested that at least three locking elements be provided for locking the turret head in position, and preferably three annular locking elements which are concentric to the turret axis, a first locking element being securely connected to the turret head carrier and a second locking element to the turret head, a third locking element being displaceable in the direction of the turret axis between an operative and an inoperative position and the three locking elements being designed such that in each position of the turret head in which one of its tool stations is located in the working position the third locking element taking up its operative position engages positively in the first and the second locking elements such that the turret head is non-rotatable relative to the turret head carrier, that, in addition, the two coupling elements be designed such that by rotating the turret head about the turret axis the second coupling element of a tool spindle located in working position is releasable from the first coupling element and the second coupling element of a tool spindle located out of the working position is adapted to be brought into engagement with the first coupling element by displacing the tool spindle about the turret axis into the working position, and that the turret head be rotatable relative to a tool spindle blocking element concentric to the turret axis, a tool spindle not located in working position being secured against rotation about the spindle axis by the blocking element. The three locking elements are preferably the three toothed rings of a known, three-part HIRTH tooth system. However, a bolt displaceable in the direction of the turret axis (or a plurality of such bolts) could also be provided as third locking element. This bolt is then guided for displacement in a bore and may be inserted into a second bore, whereby the one bore is fixed in relation to the turret head carrier and the other bore in relation to the turret head. In such an inventive tool turret, the turret head need no longer be moved in axial direction to be locked and unlocked and so it allows a more rapid indexing of the turret head (the third locking element or the third locking elements can easily be constructed such that they are less bulky and, consequently, make short indexing times possible). A tool spindle can, nevertheless, be coupled in and out simply and without problem because the two coupling elements are designed in accordance with the invention such that they can be separated from one another or brought into engagement with one another simply by rotating the turret head. Finally, an unintentional rotation of a tool not located in working position is prevented with the most simple of means in a tool turret designed in accordance with the invention as described above.

In principle, the drive shaft could be withdrawn from the turret head in the direction of the turret axis prior to the indexing of the turret head and the coupling elements thereby separated from one another when they are designed accordingly. The construction does, however, become much simpler when the drive shaft is rotatably mounted in a bearing stationary in relation to the turret head carrier. This provides the additional advantage that for indexing the turret head only the smallest of masses have to be moved because the drive shaft and its bearing need not perform any axial movement.

In accordance with the invention, a tool turret of the type mentioned at the outset can also be designed such that at least three locking elements are provided for locking the turret head in position, these elements being, in particular, annular in design and arranged concentrically to the turret axis, a first locking element being securely connected to the turret head carrier and a second locking element to the turret head, a third locking element being displaceable in the direction of the turret axis between an operative and an inoperative position and the three locking elements being designed such that in each position of the turret head in which one of its tool stations is located in the working position the third locking element taking up its operative position engages positively in the first and the second locking elements such that the turret head is non-rotatable relative to the turret head carrier, that, in addition, the two coupling elements are designed such that by rotating the turret head about the turret axis the second coupling element of a tool spindle located in working position is releasable from the first coupling element and the second coupling element of a tool spindle located out of the working position is adapted to be brought into engagement with the first coupling element by displacing the tool spindle about the turret axis into the working position, and that, finally, the drive shaft is rotatably mounted in a bearing stationary in relation to the turret head carrier. A tool turret designed in accordance with the invention in this manner has all the advantages described in the above, with the exception of the feature that a tool not located in working position is secured against any unintentional rotation. The remarks made in the above apply with respect to the design of the locking elements. This inventive solution can also be further improved in that the turret head is rotatable in relation to a tool spindle blocking element concentric to the turret axis, a tool spindle not located in working position being secured against rotation about the spindle axis by this blocking element.

When it is stated in the above that the coupling having the two coupling elements which are separable from one another is provided for establishing a rotary drive connection between the drive shaft and the tool spindle of a tool holder located in working position, this formulation already results in the fact that one of the coupling elements need not necessarily be arranged directly on the drive shaft since an intermediate element effecting a rotary drive can easily be located between the drive shaft and the tool spindle. For example, the drive shaft could extend parallel to the turret axis and be in rotary drive connection via a miter gear with an intermediate shaft which is oriented radially in relation to the turret axis. This intermediate shaft then bears the one coupling element and is aligned with the tool spindle of a tool holder located in working position. The inventive solution can, however, also be used for tool turrets, in which the tool spindles are oriented parallel to the turret axis. However, embodiments are preferred, in which the drive shaft extends in radial direction in relation to the turret axis, whereby it can then be aligned with a tool spindle or, via a miter gear, drive an intermediate shaft aligned with the tool spindle, with the said coupling then being provided between this intermediate shaft and the tool spindle.

Normally, only one single tool located in one single working position will be driven. However, with the drive shaft of an inventive tool turret, two tools can easily be driven and a recommended embodiment for this is one, in which the drive shaft defines two working positions for tool stations which are located opposite one another in radial direction in relation to the turret axis and is provided with two first coupling elements.

The coupling elements of the coupling provided between drive shaft and tool spindle could be designed in many different ways, as long as they merely allow the two coupling elements to be separated from one another or brought into engagement with one another by rotating the turret head. For example, the one coupling element could have a pin which is oriented tangentially in relation to the turret axis and is insertable into a correspondingly oriented bore in the other coupling element due to rotation of the turret head. However, the simplest embodiment is one, in which the one coupling element has at least one groove extending transversely to the drive shaft axis and the tool spindle axis, respectively, and the other coupling element has at least one correspondingly oriented projection for engaging in this groove. Such a construction is not only simple to produce but it also allows rotation of the turret head in both directions. Therefore, the two coupling elements could, for example, each have such a profile on their facing ends that the two profiles can be brought into engagement with one another by rotating the turret head.

In the case of inventive tool turrets having a drive shaft oriented in radial direction in relation to the turret axis, embodiments are recommended, which are provided with a central shaft concentric to the turret axis and rotatably mounted in a bearing fixed in relation to the turret head carrier, this central shaft being in constant drive connection with the drive shaft via a miter gear. In a tool turret of this type the miter gear is always formed by the same gear wheels so that a pair of bevel wheels forming this miter gear can, for example, be lapped in and may be operated at higher rotational speeds than the miter gears of the known tool turrets described above. Furthermore, a hollow space of the inventive tool turret which accommodates a miter gear of this type can be sealed without problem so that an oil bath can be provided for the miter gear. A quite considerable advantage of the constant drive connection between central shaft and drive shaft is, however, to be seen in the fact that a state which is possible in the known tool turrets having an axially displaceable turret head cannot occur, namely that the gear wheels of the miter gear abut on one another tooth crest against tooth crest once the turret head has been indexed.

For embodiments, in which the drive shaft is aligned with a tool spindle located in working position, small alignment faults can be avoided in that the first coupling is arranged on the drive shaft via an elastic connection such that the first coupling element can be deflected transversely to the drive shaft axis. Such a construction is particularly advantageous in conjunction with coupling elements, in which one or more projections of the one coupling element engage in one or more grooves of the other coupling element, whereby this groove extends or these grooves extend transversely to the drive shaft axis and the tool spindle axis, respectively.

The blocking element, with which the tool spindles not located in working position are secured against rotation, need only be attached such that it does not rotate with the turret head. However, embodiments are preferred, in which the blocking element is rigidly connected directly or indirectly with the turret head carrier.

The most varied embodiments of the blocking device consisting of blocking element and tool spindle (or a part rigidly connected with the latter) are possible. For example, the blocking element could be a strong magnet which interacts with eccentrically arranged magnets of the tool spindles and the second coupling element, respectively. It is, however, much simpler for the blocking element to have a first sliding surface concentric to the turret axis, a second sliding surface fixed on the tool spindle abutting on this first sliding surface when the associated tool holder is not located in the working position. In this case, the second sliding surface need only be designed such that it does not allow the tool spindle to rotate about its axis when it abuts on the first sliding surface. Since, as will be shown in the following, the turret head in preferred embodiments of the inventive tool turret is or can be indexed only when the tool spindle currently in working position or the drive shaft takes up a specific angular position, it can be easily ensured that the second sliding surface fixed on the tool spindle is oriented, when the turret head is indexed, such that it extends parallel to the first sliding surface of the blocking element and during rotation of the turret head abuts on this first sliding surface at least almost free from play. The specified second sliding surface could be provided on the tool spindles themselves. It is, however, apparent from the following that a particularly simple construction results when the second sliding surface is provided on the second coupling element.

The two sliding surfaces can be of the most varied design as long as they merely allow the turret head to rotate. For example, they could be surfaces which are convex and concave in their axial cross section (in relation to the turret axis) and adapted in their profile to one another. To simplify the production of the inventive tool turret it is, however, recommended that one of the two sliding surfaces be formed by a rib extending in circumferential direction in relation to the turret axis and the other sliding surface be formed by a groove shaped for engagement of this rib.

In order to prevent a tool spindle located in working position from rotating in an undesired manner when the turret head is unlocked but has not been rotated further, particularly advantageous embodiments of the inventive tool turret are characterized by the fact that for locking the drive shaft against rotation when the turret head is unlocked a second coupling with two coupling halves is provided, a first coupling half being non-rotatably connected to the turret head carrier and the second non-rotatably connected to the drive shaft and at least one coupling half being movable between an operative and an inoperative position, and that movement transfer means for a movement of the movable coupling half as a function of the displacement of the third locking element are provided such that the second coupling is engaged when the turret head is unlocked. In such a construction, no special pressure-medium cylinder or the like is required to activate the second coupling since this is also activated by the movement transfer means when the third locking element is displaced.

It would be possible to provide a first motor for driving the tool or tools and a second motor for rotating the turret head. However, for reasons of space and cost the invention recommends embodiments having only one single motor, which not only drives the tool or tools but also rotates the turret head. In this respect, a particularly simple construction results when an indexing shaft for rotating the turret head, an actuatable third coupling between a multifunctional shaft rotatably mounted on the turret head carrier and the drive side of the second coupling, an actuatable fourth coupling between the multifunctional shaft and the indexing shaft as well as movement transfer means for actuating the third and fourth couplings as a function of the displacement of the third locking element are provided such that when the turret head is unlocked the third coupling is disengaged and the fourth coupling engaged. Such a construction also ensures that the turret head drive can operate only when the turret head is unlocked and the drive shaft is secured against any unintentional rotation.

In preferred embodiments of the inventive tool turret, all the actuating and indexing operations, with the exception of the rotation of the turret head, can be accomplished, in particular hydraulically, with only one single piston actuated by pressure medium or by two such pistons, and to further simplify the construction it is recommended that the third locking element be designed directly as a ring piston of a pressure-medium cylinder-piston unit concentric to the turret axis. This ring piston could be acted on by pressure medium from both sides so that the turret head can be both unlocked and locked with this piston. Above all for reasons of deriving other functions from the unlocking movement of the third locking element it is, however, recommended, that the piston effecting the locking be constructed as a piston acted upon by pressure medium on one side and that a second pressure-medium cylinder-piston unit be proved for the unlocking of the turret head. This measure then enables, for example, a simple drag connection to be provided between the piston of the unlocking unit and the movable coupling half of the second coupling, and likewise between the piston of the unlocking unit, on the one hand, and the third as well as the fourth coupling, on the other hand.

Additional features, advantages and details of the invention result from the attached claims and/or the following specification and the attached drawings of two particularly advantageous embodiments of the inventive tool turret; in the drawings:

DETAILED DESCRIPTION

Figure 1A:
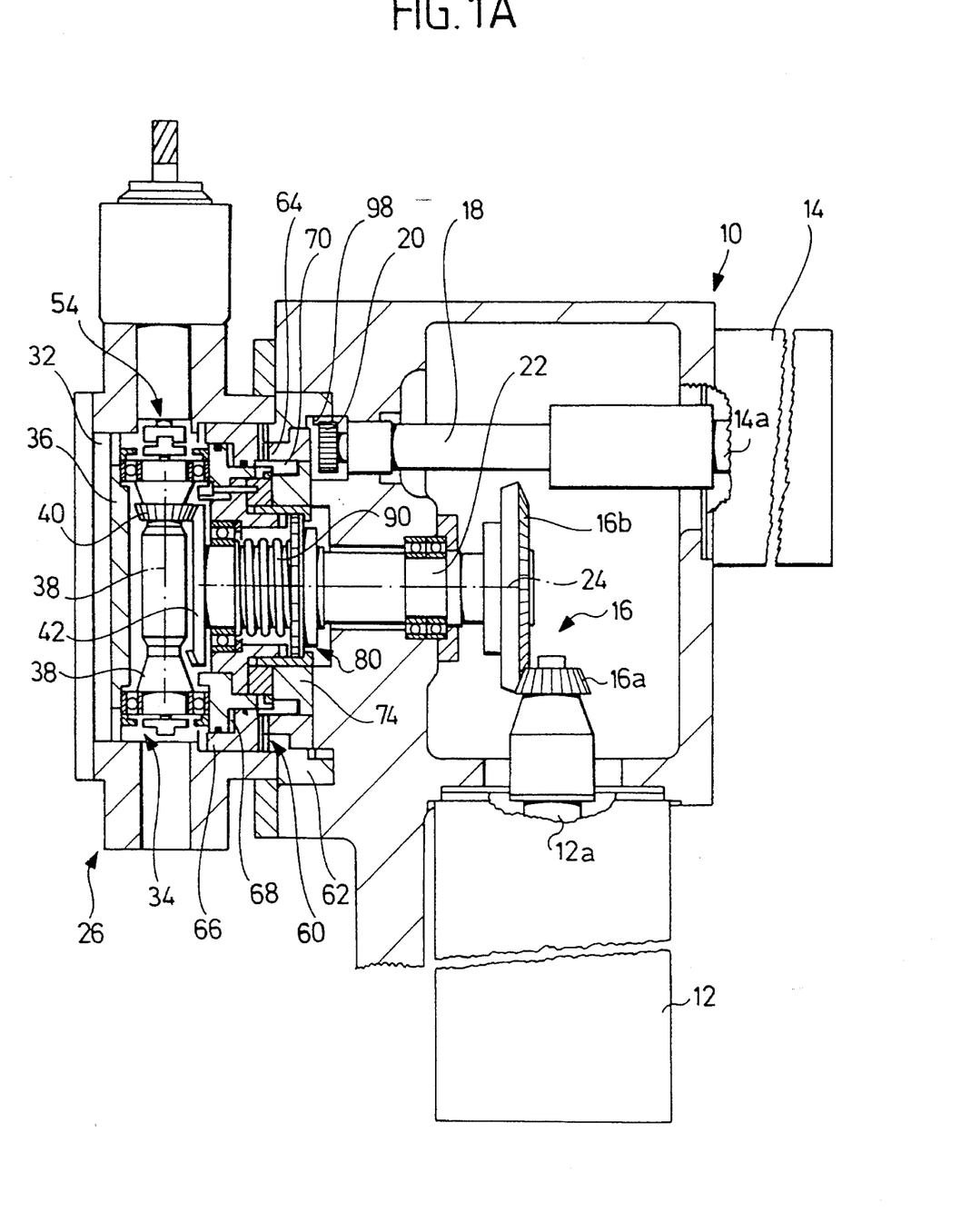
FIG. 1A is an axial section through the first preferred embodiment of the inventive tool turret with two motors for the tool drive, on the one hand, and for indexing the turret head, on the other.
Figure 1B:
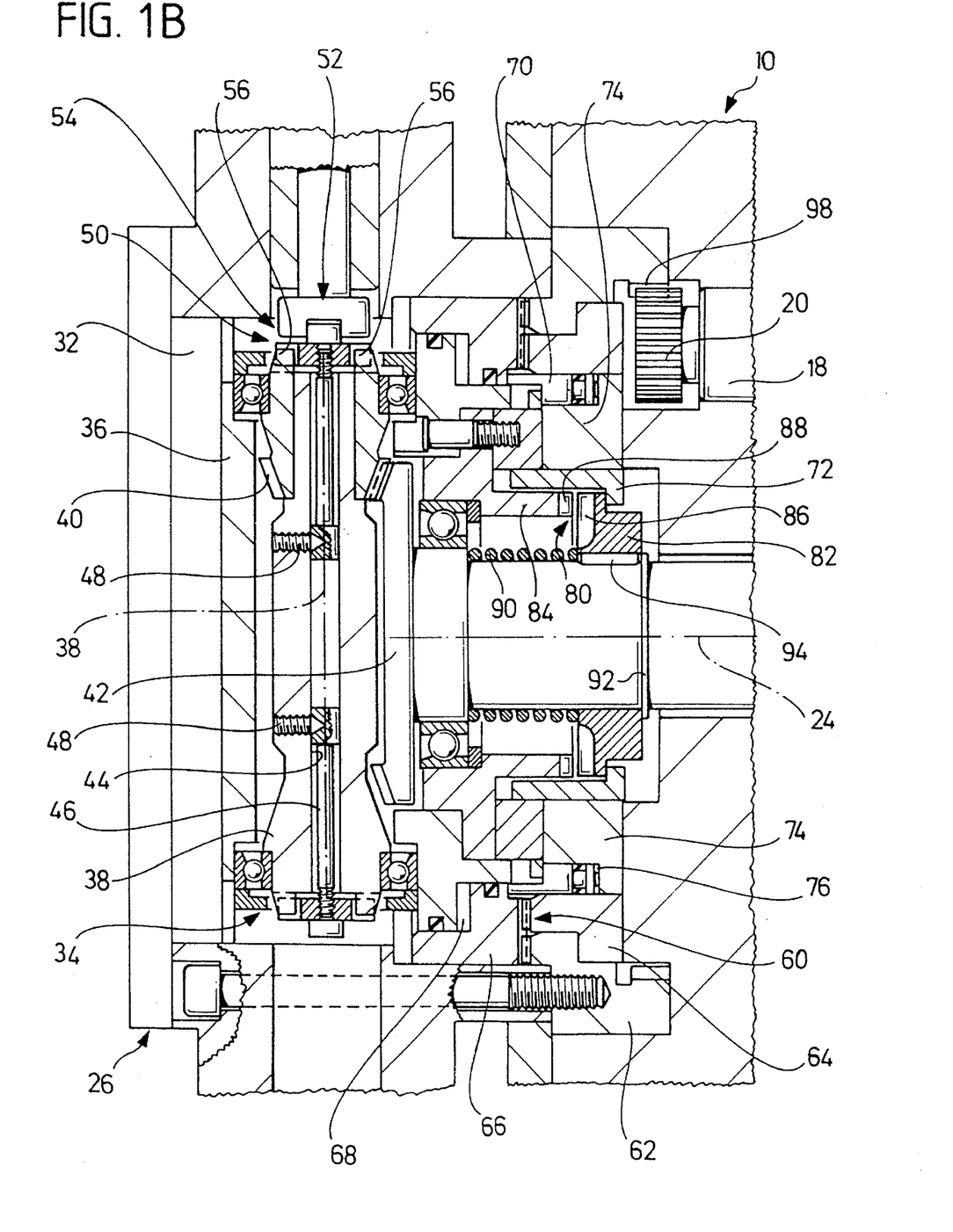
FIG. 1B is a detail from FIG. 1A on a larger scale.

FIGS. 1A and 1B show a housing-shaped turret head carrier 10 which can, for example, be mounted on a slide of a lathe. A first motor 12 for driving tools and a second motor 14 for rotating or indexing a turret head are attached to this carrier, whereby a first bevel wheel 16a of a miter gear 16 is attached to a motor shaft 12a of the first motor while a motor shaft 14a of the second motor 14 drives an indexing shaft 18 for a turret head. A pinion 20 is attached to the front end of the indexing shaft 18. Finally, a central shaft 22 is mounted in the turret head carrier 10 so as to be rotatable about a turret axis 24 but axially non-displaceable. A second bevel wheel 16b of the miter gear 16 is attached to the rear end of the central shaft and is in constant engagement with the bevel wheel 16a.

Figure 2:
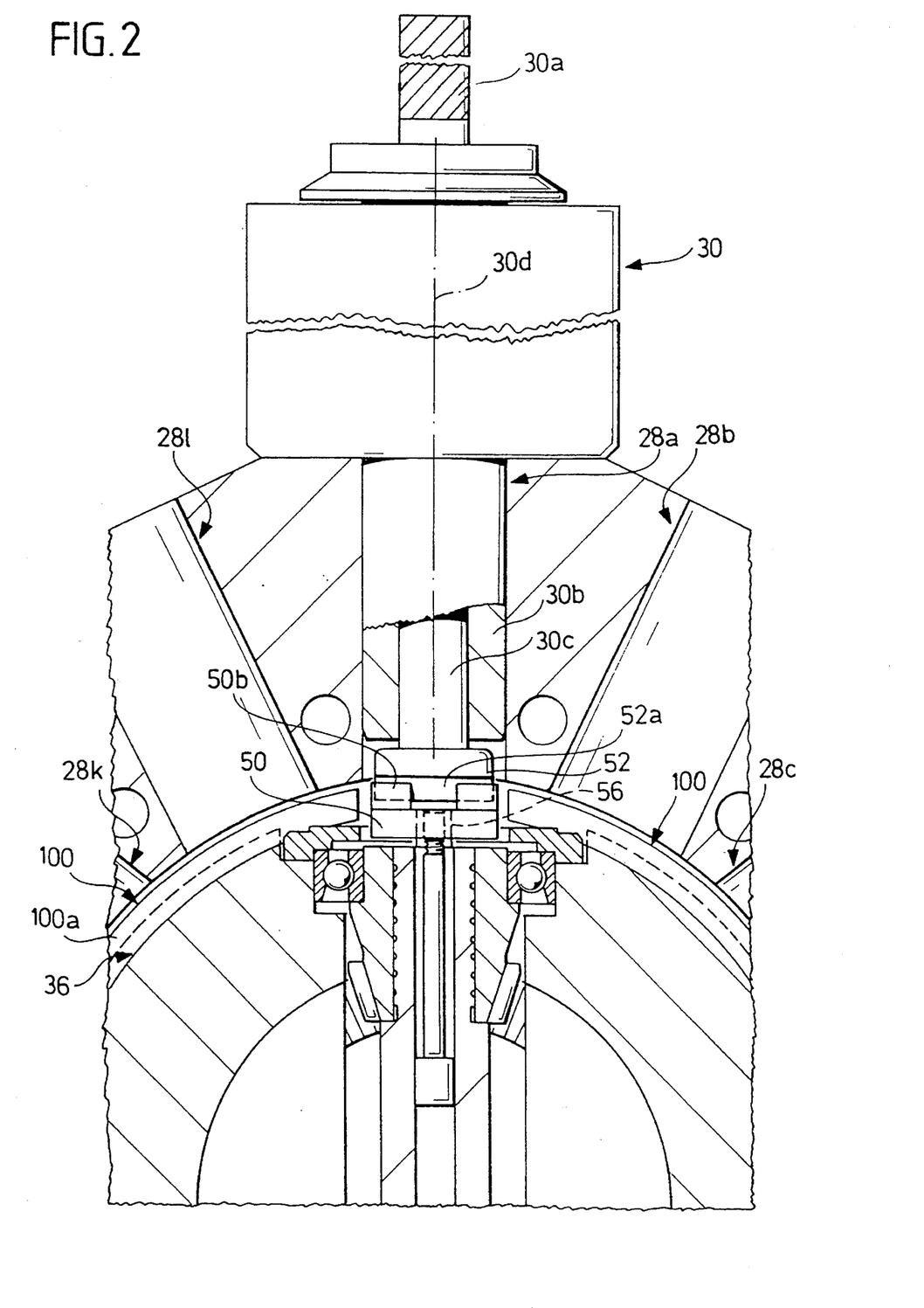
FIG. 2 is a section through part of the turret head and the gear housing comprised by the latter according to line 2—2 in FIG. 1A.

A turret head 26 is mounted on the turret head carrier 10 so as to be rotatable about the turret axis 24 but non-displaceable in axial direction. In the illustrated embodiment, the turret head 26 has twelve tool stations 28a to 28l (cf. FIG. 2 which does, however, show only some of these tool stations), which are formed in the illustrated embodiment by receiving bores for tool carriers which are radial in relation to the turret axis 24. In FIGS. 1 and 2, only a single such tool carrier 30 having a drivable tool 30a, illustrated here as a milling tool, has been illustrated. These tool carriers have a holding shaft 30b which can be clamped in the turret head 26 by means which are not illustrated in detail as well as a tool spindle 30c which is mounted in the tool carrier so as to be rotatable about a spindle axis 30d but non-displaceable in axial direction. In the preferred embodiment, the spindle axes 30d extend in radial direction in relation to the turret axis 24, and this also applies to the illustrated tool 30a although it is obvious that an angular gear could also be included in such a tool carrier in order to drive a tool oriented in a different direction.

In accordance with the invention, the interior of the turret head 26 forms a hollow space 32 for accommodating a gear designated as a whole as 34 and attached, in accordance with the invention, to the turret head carrier 10. The gear has a gear housing 36, in which a drive shaft 38 is mounted so as to be rotatable but non-displaceable in the direction of the shaft axis. The drive shaft axis 38a is oriented in accordance with the invention such that it intersects the turret axis 24 and extends at right angles thereto. A bevel wheel 40 is provided on the drive shaft 38 which is, in accordance with the invention, designed in addition as a hollow shaft. This bevel wheel is, in accordance with the invention, in constant engagement with a bevel wheel 42 which is attached to the front end of the central shaft 22, whereby these two bevel wheels form a miter gear. A bending rod 46 is arranged in a longitudinal bore 44 of the drive shaft 38 concentric to the drive shaft axis 38a. In a central region with a larger diameter, this rod is secured in position in the drive shaft 38 by means of tightening screws and at each of the free ends in regions smaller in diameter bears a first coupling element 50 which interacts with a second coupling element 52 of a first coupling designated as a whole as 54. The two coupling elements are securely attached to the bending rod 46 and the tool spindle 30c, respectively, and will be explained in greater detail in the following on the basis of FIGS. 3A and 3B.

Figure 3A:
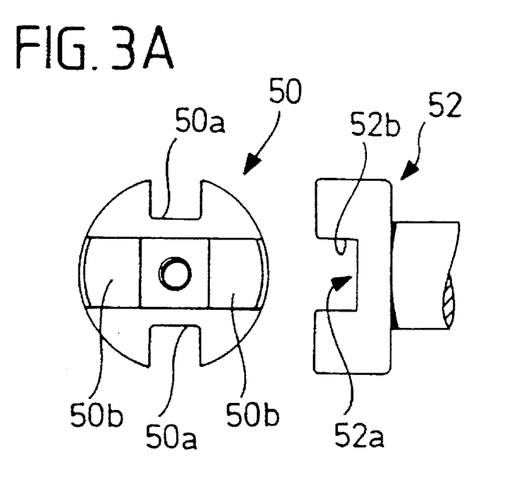
FIG. 3A is a plan view onto a first coupling element, seen in the direction of the drive shaft axis, in conjunction with a side view of a corresponding second coupling element of a tool spindle.
Figure 3B:
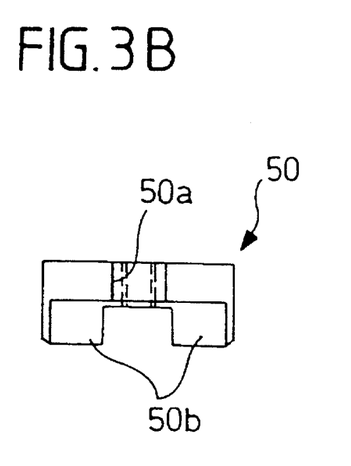
FIG. 3B is a side view of the first coupling element, seen from above in FIG. 3A.

The two coupling elements 50 and 52 have the shape of flat discs; the first coupling element 50 has two approximately rectangular grooves 50a located opposite each other at its circumference and, at its end facing the second coupling element 52, two approximately cube-shaped projections 50b for engagement in a groove 52a of the second coupling element 52.

As shown, above all, in FIGS. 1B and 2, two claws 56 are attached to each of the ends of the drive shaft 38. These claws extend in the direction of the drive shaft axis 38a and engage in the grooves 50a of the two first coupling elements 50, and such that when the bending rod 46 is not deflected the two claws of a pair of claws do not rest on the base of the respectively associated groove 50a. In this way, a first coupling element 50 can be displaced somewhat in both directions transversely to the drive shaft axis 38a, namely in the direction of the connecting line between the two associated claws 56. On the other hand, the two projections 50b can be displaced in the groove 52a, and since, as shown in FIG. 3A, a connecting line between the two projections 50b extends at right angles to a connecting line between the two grooves 50a, the two coupling elements 50 and 52, in conjunction with the bending rod 46, make it possible to compensate for small errors in alignment when, for example, the spindle axis 30d of a tool carrier 30 is not exactly aligned with the drive shaft axis 38a. In accordance with the invention, the first coupling 54 is therefore designed such that it allows displacements of its two coupling elements relative to one another along two transverse axes.

A three-part, so-called HIRTH tooth system 60 serves to lock the turret head 26 in relation to the turret head carrier 10, namely against any rotation about the turret axis 24. Such three-part HIRTH tooth systems are known and are constructed such that the HIRTH tooth system 60 centers the turret head 26 in relation to the turret axis 24 when the turret head is locked. For this reason, the turret head 26 is, in accordance with the invention, mounted on the turret head carrier 10 in such sleeve bearings that these do not result in any centering of the turret head in relation to the turret axis 24 to avoid the system being over-determined. The HIRTH tooth system 60 and its functioning will be explained in detail in the following:

It consists of three rings concentric to the turret axis 24, namely a first ring 62 secured to the turret head 26, a second ring 64 secured to the turret head carrier 10 and a third ring 66 which is located opposite the two rings 62 and 64 and is mounted in the turret head 26 for displacement in the direction of the turret axis 24. At their ends facing the third ring 66, the first ring 62 and the second ring 64 are each provided with a toothed ring and the third ring 66 has a third toothed ring at its end facing the two other rings. In the position of the third ring 66 illustrated in FIGS. 1A and 1B, its toothed ring engages without play in the toothed rings of the two other rings 62 and 64. In this state, the turret head 26 cannot be rotated in relation to the turret head carrier 10. As best shown in FIG. 1B, a pressure chamber 68 is provided to the left of the third ring 66, into which a pressure medium, in particular hydraulic oil, can be introduced via channels which are not illustrated in order to press the third ring 66 against the two other rings 62 and 64. The gear housing 36 and the turret head 26 therefore form a pressure-medium cylinder for a ring piston which is formed by the third ring 66.

Figure 4:
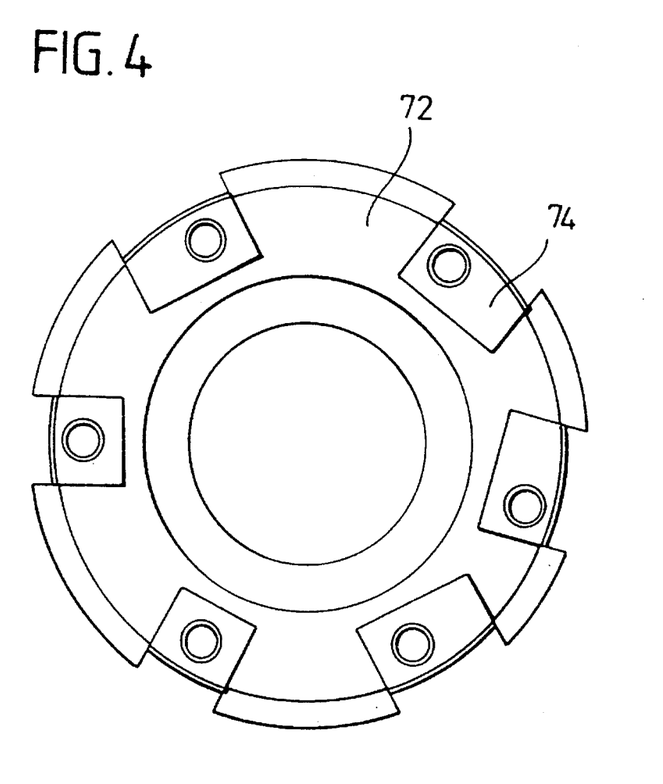
FIG. 4 is a front view of the part effecting the transfer of movement from the third locking element to the second coupling, seen from the left in accordance with FIG. 1A.

To unlock the turret head 26 or rather to displace the third ring 66 to the left according to FIG. 1B, a second ring piston 70 which is concentric to the turret axis 24 is provided. This ring piston is designated in the following as unlocking piston. As illustrated in FIG. 1B, the end face of the unlocking piston 70 which is to the left according to this Figure is of a stepped design so that the piston abuts, on the one hand, on the right end face of the third ring 66 and, on the other hand, forms a support for a displacer sleeve 72 which is likewise concentric to the turret axis 24. Consequently, the unlocking piston 70 takes the displacer sleeve along with it when it is displaced to the left since the displacer sleeve 72 is mounted so as to be displaceable in the direction of the turret axis 24. The unlocking piston 70 is mounted for displacement in the direction of the turret axis 24 between the second ring 64 and a guide ring 74 likewise attached to the turret head carrier 10 and the rings 64 and 74 form a pressure chamber 76 to the right of the unlocking piston 70 according to FIG. 1B. Pressure medium, in particular hydraulic oil, can be introduced into this pressure chamber via a channel which is not shown in order to displace the unlocking piston 70 and therefore the third ring 66 to the left and thereby unlock the turret head 26 without this having to be moved itself in axial direction. As shown in FIG. 4, the displacer sleeve 72 has projections engaging through recesses provided in the guide ring 74 in a radial direction outwards, and these projections abut on the end face of the unlocking piston 70 which is to the left according to FIG. 1B.

A second coupling concentric to the central shaft 22 has been designated as a whole as 80. It is formed by an annular coupling disc 82 concentric to the turret axis 24 and a neck-shaped extension 84 of the gear housing 36 which are each provided at their facing ends with an annular set of claws 86 and 88, respectively, concentric to the turret axis 24. These claws can engage in one another at least almost free from play when the coupling disc 82 is moved to the left according to FIG. 1B. The coupling disc 82 is mounted on the central shaft 22 for displacement in the direction of the turret axis 24 and, in its position illustrated in FIG. 1B, is pressed by a pressure spring 90 against an annular collar 92 of the central shaft 22. On the other hand, the coupling disc 82 is non-rotatably connected to the central shaft 22, namely by means of adjusting springs 94 on the central shaft 22 and correspondingly designed, axial grooves, which are not illustrated, on the inner circumference of the coupling disc 82. Since the gear housing 36 is secured to the turret head carrier 10, the coupling disc 82 is non-rotatably connected to the central shaft 22 and, finally, a quite specific angular position of a tool 30a coupled in with the aid of the first coupling 54 is associated with each angular position of the central shaft 22, the claws 86 and 88 of the second coupling 80 can be brought into engagement with one another only in quite specific angular positions of the tool 30a—this is, of course, the tool 30a, or rather the tool station 28a thereof, which is located in a working position determined and defined by the position of the drive shaft 38.

If the turret head 26 is unlocked by releasing the HIRTH tooth system 60, i.e. the unlocking piston 70 is moved to the left according to FIG. 1B, the central shaft 22 is locked at the same time so that the tool 30a can also no longer turn. At the same time, it can be ensured by means of the design of the sets of claws 86, 88 that the turret head 26 can be unlocked only when the tool 30a takes up a quite specific angular position or, in the preferred embodiment illustrated, one of two quite specific angular positions, in which the groove 52a of the second coupling element 52 associated with this tool extends in a direction which is tangential to the turret axis 24, i.e. at right angles to the plane of drawing in FIG. 1B. This ensures not only that driven tools are always used at the correct angle of rotation but that the first coupling 54 can be released, after the turret head 26 has been unlocked, solely by rotating the turret head about the turret axis 24 (FIGS. 1A and 1B show the tool 30a in this position in which the turret head 26 can be rotated about the turret axis 24 after it has been unlocked). The number of claws in the sets of claws 86, 88 does, of course, depend on the transmission ratio between the bevel wheels 40 and 42 so that it is ensured that the groove 52a is always oriented at right angles to the plane of drawing in FIG. 1B when the claws 86 and 88 engage in one another. Finally, it is pointed out merely as a precaution that a tool is secured against rotation with the aid of the coupling 80 only for as long as the two coupling elements 50 and 52 are in engagement with one another.

In order to be able to rotate the turret head 26 once it is unlocked, the pinion 20 of the indexing shaft 18 engages in a toothed rim 98 which is provided on the first ring 62 of the HIRTH tooth system 60 securely connected to the turret head 26.

It will now be explained on the basis of FIG. 2 how the tool spindles 30 of those tools which are not located in a working position are prevented from rotating in an undesired manner during work done with a turret tool but also during the indexing of the turret head 26. In this connection, it is to be noted that in the illustrated, preferred embodiment of the inventive tool turret two diagonally opposed working positions are provided for its drivable tools and these positions are defined by the drive shaft 38. Only one of these positions is shown in FIG. 2, namely that in which the tool station 28a is just located. For this reason, two almost semicircular ribs or rails 100 are attached to the gear housing 36 and these engage in the grooves 52a of the second coupling elements 52 of those tools which are not located in a working position while the two ribs 100 form for each working station a gap which is apparent from FIG. 2. Each of these ribs 100 forms on each of their sides facing one another a sliding surface 100a, of which at least one interacts with one of the two side walls of the groove 52a so that the two groove side walls form sliding surfaces 52b.

This ensures, in accordance with the invention, that the groove 52a associated with a new tool to be brought into use can be moved over the projections 50b of the first coupling element 50 of the drive shaft 38 when the turret head 26 is indexed.

Figure 5A:
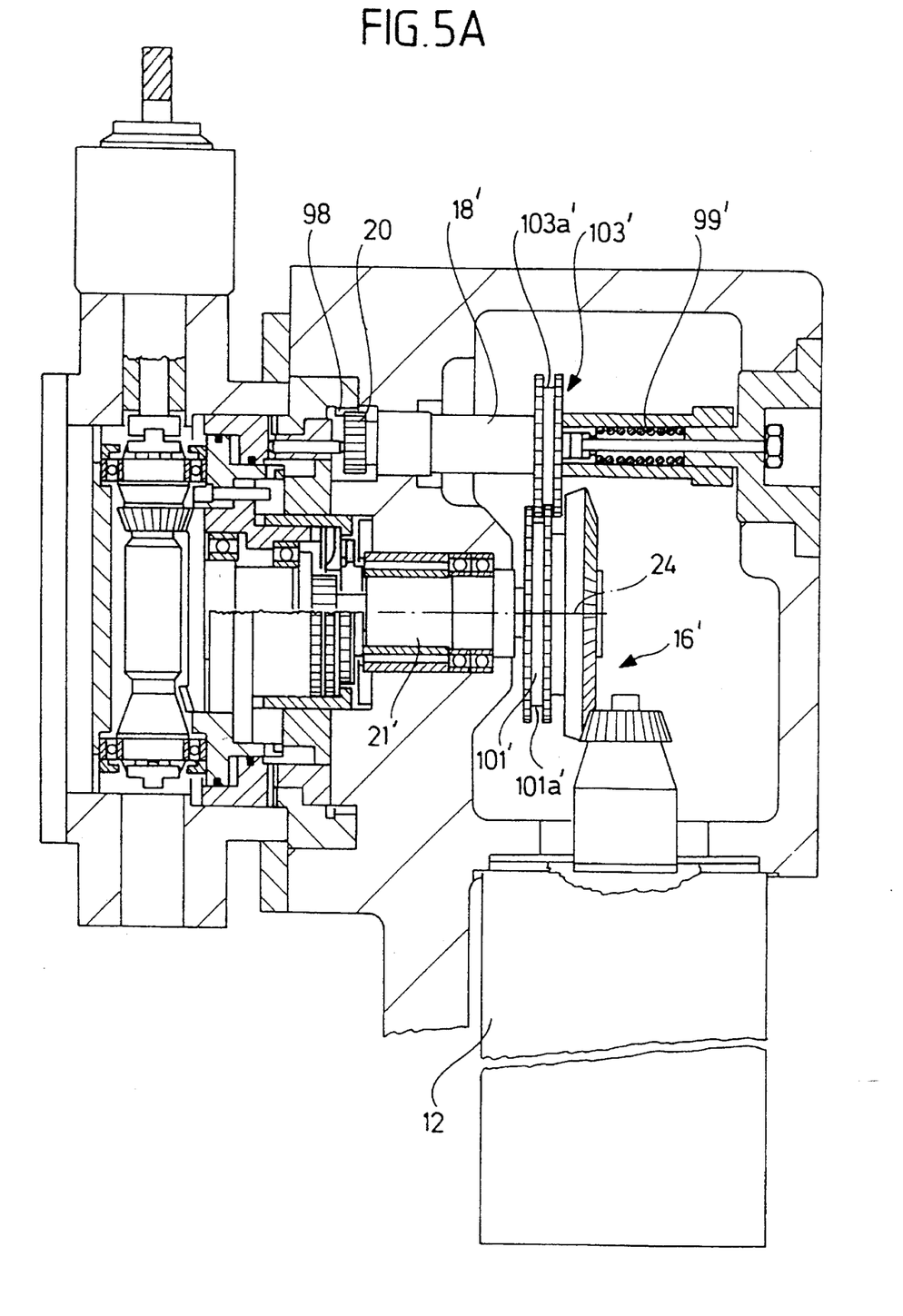
FIG. 5A is a representation corresponding to FIG. 1A of the second preferred embodiment with only one motor for the tool drive and the rotation of the turret head.
Figure 5B:
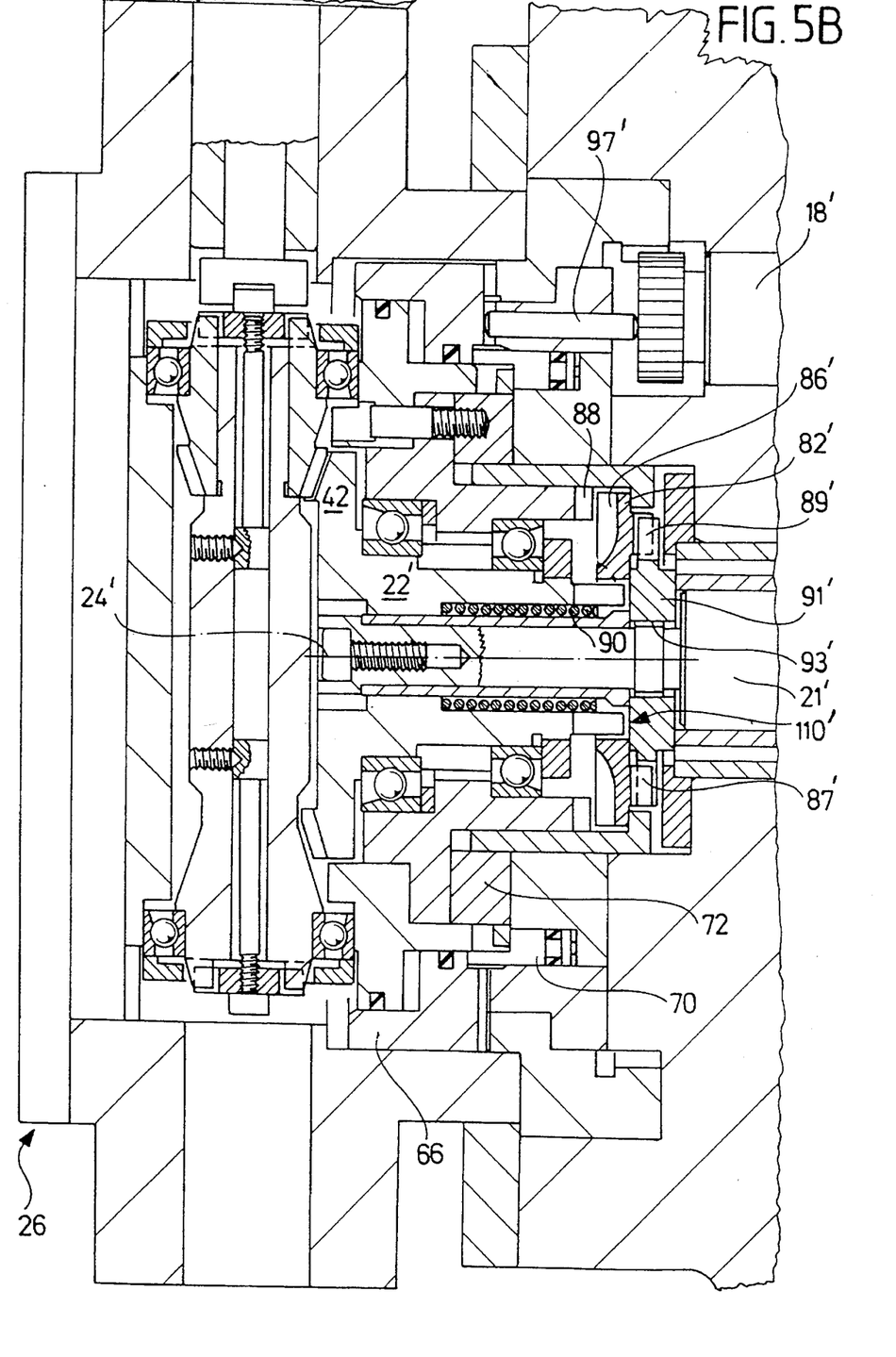
FIG. 5B is a representation corresponding to FIG. 1B of the second embodiment.

The second, even more advantageous embodiment of the inventive tool turret, which is illustrated in FIGS. 5A and 5B, differs from the first embodiment described in the above only in that the motor 12 for driving the tools also undertakes the task of indexing the turret head, i.e. in the construction of the turret head indexing drive, so that only the turret head indexing drive will be explained in the following and FIGS. 5A and 5B contain reference numerals only for those elements of the tool turret which show the difference between the two embodiments.

In the second embodiment, the motor 12 drives a multifunctional shaft 21' via a miter gear 16'. A central shaft 22' is located in front of this multifunctional shaft and a bevel wheel 42 is arranged on its front end. A coupling disc 82', which is held by the central shaft 22' via splines 110' for displacement coaxially to the turret axis 24' as well as in the direction of this axis, is again provided with a set of claws 86' at its left-hand side according to the drawing. These claws interact in the manner already described with the claws 88 of the gear housing while the coupling disc 82' is provided at its right-hand side according to the drawing with a second set of claws 87' which can be brought into engagement with claws 89' of an entrainer disc 91' which is driven by the multifunctional shaft 21' via splines 93'. The coupling disc 82' is again held by the pressure spring 90 in its position shown in FIGS. 5A and 5B, in which the multifunctional shaft 21' drives the central shaft 22', namely via the splines 93', the entrainer disc 91', the claws 87' and 89', the coupling disc 82' and the splines 110'. If the unlocking piston 70 is moved to the left according to the drawing, it takes along the coupling disc 82' via the displacer sleeve 72 so that its claws 86' are brought into engagement with the claws 88 and the central shaft 22' is locked in position while, at the same time, the drive connection between the multifunctional shaft 21' and the central shaft 22' is released since the claws 87' are disengaged from the claws 89'.

In this second embodiment, an indexing shaft 18' is displaceable in the direction of its shaft axis, namely to the left out of an inoperative position illustrated in FIGS. 5A and 5B into an operative position. This displacement of the indexing shaft 18' to the left takes place automatically with the unlocking of the turret head 26: When, namely, the third ring 66 of the HIRTH tooth system is moved to the left by the unlocking piston 70, it also allows a displacement to the left of a bolt 97' abutting on the third ring 66, the indexing shaft 18' likewise abutting on this bolt due to the action of a pressure spring 99'. A toothed wheel 101' is secured to the multifunctional shaft 21' and this toothed wheel can interact with a toothed wheel 103' secured to the indexing shaft 18'. Each of these two toothed wheels has a recess in the form of an annular groove 101a' and 103a', respectively, which is dimensioned such that the two toothed wheels do not mesh with one another in the position of the indexing shaft 18' illustrated in FIG. 5A but when the turret head is unlocked because the path of displacement of the third ring 66 corresponds to the width of the grooves 101a' and 103a'. It must be added that in this second embodiment, as well, the pinion 20 is always in engagement with the toothed rim 98.

In both embodiments the three-part HIRTH tooth system therefore provides a simple, reliable and inexpensive solution to the problem of achieving shorter turret head indexing times and at the same time provides a simple possibility of disengaging driven tools not being used.

The displaceable part of the HIRTH tooth system need not necessarily be designed as a hydraulic piston since it could, in principle, be pressed into its locking position by a spring, as well, so that it would be possible to manage with only the unlocking piston 70. A special feature of the invention is the fact that a safety function is derived from the unlocking piston which prevents any faulty positioning of the tool drive and, therefore, any damage. According to an additional, special feature of the invention, a switchover-type coupling function is derived from the unlocking piston in order to be able to drive the tools or index the turret head when using only one motor.

We claim:

1. Tool turret for a machine tool, in particular a lathe, with a turret head mounted on a turret head carrier for rotation about a turret axis and having a plurality of tool stations, said turret head having at each of a plurality of its tool stations a receiving means for the insertion of a tool holder for a tool adapted to be rotatably driven, said tool holder having a tool spindle, with at least three annular locking elements concentric to the turret axis for locking the turret head against rotation about the turret axis in relation to the turret head carrier, a first locking element being securely connected to the turret head carrier and a second locking element to the turret head, a third locking element being displaceable in the direction of the turret axis between an operative and an inoperative position and the three locking elements being designed such that in each angular position of the turret head in which one of its tool stations is located in a working position the third locking element being in its operative position engages positively in the first and second locking elements such that the turret head is non-rotatable relative to the turret head carrier, with a multifunctional shaft rotatably mounted on the turret head carrier and drivable by a motor provided both for rotating the turret head and driving a tool spindle, an indexing shaft rotatably mounted on the turret head carrier for rotating the turret head, a tool drive shaft drivable by the multifunctional shaft, said tool drive shaft being rotatably mounted in a bearing stationary in relation to the turret head carrier and the turret head being rotatable about the turret axis in relation to said tool drive shaft, and with an actuatable turret indexing coupling between the multifunctional shaft and the indexing shaft, characterized in that the tool drive shaft (38) is arranged such that it defines a working position for the tool stations (28a–28l), that a tool drive coupling (54) is provided for establishing a rotary drive connection between the tool drive shaft (38) and the tool spindle of a tool holder (30) located in working position, said tool drive coupling having at least two coupling elements (50, 52) separable from one another, a first coupling element (50) being in rotary drive connection with the tool drive shaft (38) and the second coupling element (52) being arranged on the tool spindle, wherein the two coupling elements (50, 52) are designed such that by rotating the turret head (26) about the turret axis (24) the second coupling element (52) of a tool spindle located in working position is releasable from the first coupling element (50) and the second coupling element (52) of a tool spindle located out of the working position is adapted to be brought into engagement with the first coupling element (50) by displacing the tool spindle about the turret axis (24) into the working position, that the turret head (26) is rotatable in relation to a tool spindle blocking element (100) concentric to the turret axis (24), a tool spindle not located in working position being secured against rotation about the spindle axis by said blocking element, that an actuatable separation coupling (87', 89') is provided between the multifunctional shaft (21') and the tool drive shaft (38), and that a drive shaft blocking coupling (86', 88') with two coupling halves is provided for locking the tool drive shaft (38) against rotation when the turret head (26) is unlocked, a first half (88') of said blocking coupling being non-rotatably connected to the turret head carrier (10) and the second half (86') being non-rotatably connected to the tool drive shaft (38).

2. Tool turret as defined in claim 1, characterized in that the tool drive shaft (38) extends in radial direction in relation to the turret axis (24).

3. Tool turret as defined in claim 2, characterized in that the tool drive shaft (38) defines two working positions for tool stations located opposite one another in radial direction in relation to the turret axis (24) and is provided with two first coupling elements (50).

4. Tool turret as defined in claim 1, characterized in that the one coupling element (52) of the tool drive coupling (54) has at least one groove (52a) extending transversely to the tool drive shaft axis (38a) and the tool spindle axis, respectively, and the other coupling element (50) has at least one correspondingly oriented projection (50b) for engagement in this groove.

5. Tool turret as defined in claim 2, characterized by a central shaft (22') concentric to the turret axis (24) and rotatably mounted in a bearing fixed in relation to the turret head carrier (10), said central shaft being in constant drive connection with the tool drive shaft (38) via a miter gear (40, 42).

6. Tool turret as defined in claim 1, characterized in that the first coupling element (50) of the tool drive coupling (54) is arranged on the tool drive shaft (38) via an elastic connection (46) such that the first coupling element (50) is deflectable transversely to the tool drive shaft axis (38a).

7. Tool turret as defined in claim 6, characterized by a form-locking rotary entrainment means (50a, 50b, 52a, 52b) between tool drive shaft (38) and first coupling element (50) allowing a transverse deflection of the first coupling element (50).

8. Tool turret as defined in claim 6, characterized in that the tool drive shaft (38) is designed as a hollow shaft and accommodates a bending rod (46), the first coupling element (50) being attached to said bending rod and said bending rod being attached to the hollow shaft (38) at a distance from said first coupling element.

9. Tool turret as defined in claim 1, characterized in that the blocking element (100) is rigidly connected to the tool turret carrier (10).

10. Tool turret as defined in claim 1, characterized in that the blocking element (100) has a first sliding surface (100a) concentric to the turret axis (24), a second sliding surface (52b) fixed on the tool spindle abutting on said first sliding surface when the associated tool holder (30) is outside the working position.

11. Tool turret as defined in claim 10, characterized in that the second sliding surface (52b) is provided on the second coupling element (52).

12. Tool turret as defined in claim 10, characterized in that one (100a) of the two sliding surfaces (100a, 52b) is formed by a rib (100) extending in circumferential direction in relation to the turret axis (24) and the other sliding surface (52b) is formed by a groove (52a) shaped for engagement of the rib.

13. Tool turret as defined in claim 1, characterized in that at least one coupling half (86') of the drive shaft blocking coupling (86', 88') is movable between an operative and an inoperative position, and that movement transfer means (72) for a movement of the movable coupling half (86') as a function of the displacement of the third locking element (66) are provided such that the drive shaft blocking coupling (86', 88') is engaged when the turret head (26) is unlocked.

14. Tool turret as defined in claim 1, characterized in that the separation coupling (87', 89') is arranged between the multifunctional shaft (21') and the drive side (86') of the drive shaft blocking coupling (86', 88').

15. Tool turret as defined in claim 1, characterized by movement transfer means (72) for actuating the separation coupling (87', 89') and the turret indexing coupling (101', 103') as a function of the displacement of the third locking element (66) such that when the turret head (26) is unlocked the separation coupling is disengaged and the turret indexing coupling engaged.

16. Tool turret as defined in claim 1, characterized in that a gear housing (36) rigidly connected to the turret head carrier (10) is arranged in the turret head (26), the turret head (26) being rotatable about said housing and the tool drive shaft (38) mounted therein.

17. Tool turret as defined in claim 5, characterized in that the central shaft (22') is mounted in the gear housing (36) and the miter gear (40, 42) is arranged in the gear housing.

18. Tool turret as defined in claim 1, characterized in that the third locking element (66) is designed as a ring piston of a pressure-medium cylinder-piston unit (26, 68, 66) concentric to the turret axis (24).

19. Tool turret as defined in claim 1, characterized in that a pressure-medium cylinder-piston unit (70, 76, 74) is provided for unlocking the turret head (26).

20. Tool turret as defined in claim 19, characterized in that a movement transfer element (72) is provided between the piston (70) of the unlocking unit (70, 76, 74) and the movable coupling half (82, 86) of the drive shaft blocking coupling (86', 88).

21. Tool turret as defined in claim 15, characterized in that movement transfer elements (72, 66, 97') are provided between the piston (70) of the unlocking unit (70, 76, 74) on the one hand and the separation coupling (87', 89') as well as the turret indexing coupling (101', 103'), on the other hand.

22. Tool turret as defined in claim 9, characterized in that the blocking element (100) is securely connected to the gear housing (36).

23. Tool turret as defined in claim 1, characterized in that the first coupling element (50) of the tool drive coupling (54) is arranged on the tool drive shaft (38).

24. Tool turret as defined in claim 16, characterized in that the central shaft (22') is mounted in the gear housing (36) and the miter gear (40, 42) is arranged in the gear housing.

25. Tool turret as defined in claim 19, characterized in that movement transfer elements (72, 66, 97') are provided between the piston (70) of the unlocking unit (70, 76, 74) on the one hand and the separation coupling (87', 89') as well as the turret indexing coupling (101', 103'), on the other hand.

26. Tool turret as defined in claim 16, characterized in that the blocking element (100) is securely connected to the gear housing (36).

* * * * *